United States Patent
Byrd

(10) Patent No.: US 6,797,795 B2
(45) Date of Patent: Sep. 28, 2004

(54) POLYSILOXANE(AMIDE-UREIDE) ANTI-ICE COATING

(75) Inventor: Norman R. Byrd, Villa Park, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/436,015

(22) Filed: May 12, 2003

(65) Prior Publication Data

US 2003/0235696 A1 Dec. 25, 2003

Related U.S. Application Data

(63) Continuation-in-part of application No. 10/164,826, filed on Jun. 7, 2002, now abandoned.

(51) Int. Cl.$^7$ .............................. C08G 77/24
(52) U.S. Cl. ......................... 528/26; 528/28; 428/447; 427/387
(58) Field of Search ................. 528/26, 28; 428/447; 427/387

(56) References Cited

U.S. PATENT DOCUMENTS

| | | | |
|---|---|---|---|
| 4,290,810 A | | 9/1981 | Montgomery |
| 4,439,337 A | | 3/1984 | Nimerick et al. |
| 5,187,015 A | | 2/1993 | Yorkgitis et al. |
| 5,844,053 A | * | 12/1998 | Nishida ............ 525/476 |
| 6,008,410 A | | 12/1999 | Olli |
| 6,191,248 B1 | | 2/2001 | Rawlings et al. |
| 6,353,135 B1 | | 3/2002 | Olli |

FOREIGN PATENT DOCUMENTS

| | | | |
|---|---|---|---|
| JP | 1-168718 | * | 7/1989 |
| WO | 96/34029 | * | 10/1996 |

OTHER PUBLICATIONS

English language translation JP 1–168718.*

* cited by examiner

*Primary Examiner*—Margaret G. Moore
(74) *Attorney, Agent, or Firm*—Alston & Bird LLP

(57) ABSTRACT

A surface coating which inhibits the formation of ice upon the surface of a substrate comprising a polysiloxane(amide-ureide) having the general formula:

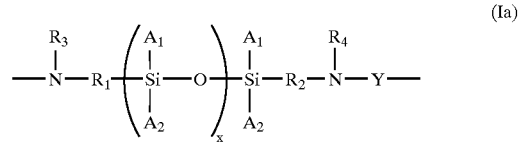

wherein $R_1$ and $R_2$ are independently selected from the group consisting of $C_1$ to $C_{10}$ alkyls, aryls, and polyaryls; $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; x is a number from 1 to 1000; and Y is selected from a dicarboxyl residue and a non-linear diisocyanate residue. The polysiloxane(amide-ureide) is formed by reacting at least one diamine terminated polysiloxane, at least one halide substituted dicarboxylic acid, and at least one non-linear diisocyanate.

45 Claims, 3 Drawing Sheets

POLYSILOXANE(AMIDE-UREIDE) ANTI-ICE COATING

RELATED APPLICATIONS

This application is a continuation-in-part (CIP) of U.S. patent application Ser. No. 10/164,826, filed Jun. 7, 2002, now abandoned, the contents of which are incorporated herein by reference.

FIELD OF THE INVENTION

This invention relates to a polymeric coating which inhibits the adhesion of ice to the surface of an object. The invention further relates to the composition and method of making a polysiloxane(amide-ureide) which provides a durable, long-lasting, anti-ice coating when applied to a substrate.

BACKGROUND OF THE INVENTION

The everyday buildup of ice upon the surfaces of mechanical, physical, and natural objects is a familiar annoyance, and quite often a safety hazard. The slick layers of ice that form on highways, driveways, and walkways make transportation difficult. The masses of ice that accumulate within or upon industrial, agricultural, or other mechanical equipment make operation of the equipment difficult or impossible. And, the weight of ice that weighs upon power lines, buildings, and signs often causes damage to those structures.

Ice accumulation upon vehicles, such as air or marine vehicles, poses a challenging problem. For example, ships traveling in the arctic and other cold climates may have ice form thereon, thereby disadvantageously increasing the weight and decreasing the maneuverability of the ships.

Buildup of ice upon the wings and components of an aircraft is of particular concern. The lift generated by the wings, and thus the ability of the aircraft to become and remain airborne, is dependent on the shape of the wings. Even a small accumulation of ice upon the surface of the wings can significantly increase drag and dramatically reduce lift. Further, ice buildup along control surfaces of the aircraft can impede the movement of those surfaces and prevent proper control of the aircraft.

There are a large variety of techniques used to control the buildup of ice upon the wings and other surfaces of aircraft. For instance, the aircraft may be deiced before takeoff by radiant heat energy or by application of a chemical spray which melts the ice from the wings. Such deicing sprays are environmental hazards. The ritual of deicing is well known to airline passengers traveling through cold environments.

Another method of deicing aircraft includes providing flexible pneumatic coverings (bladders) along the leading edges of the wings, and supplying bursts of air or fluid to expand the flexible coverings to break away any overlying ice. Similarly, bleeding air from the aircraft engine and routing the heated air to the surface of the wing heats the wing and melts the ice. Finally, ice may be removed from the wing by providing high-current pulses of electricity to a solenoid disposed within the wing which causes the wing to vibrate, fracturing any accumulated ice.

Although the previously mentioned methods of ice removal are generally effective, they require the continuous supply of air, chemicals, or electrical power in order to rid the wing of its burden. It would be preferred, of course, to prevent the accumulation of ice in the first place, but past attempts to develop practical passive methods of ice prevention have failed.

One would expect that known non-stick coatings would be able to prevent ice from adhering to the surfaces which they coat. In fact, aluminum surfaces coated with a polytetrafluoroethylene material exhibit a zero break force between the ice and the polytetrafluoroethylene coating. However, upon repeated freezing, the favorable properties exhibited by polytetrafluoroethylene and similar coatings degrade, resulting in a coating with little or no anti-icing capacity.

What is needed is a durable surface coating with long lasting anti-icing and/or de-icing properties which does not require the continuous supply of air, chemicals, or electrical power in order to rid a surface of ice or prevent ice from forming upon the surface. What is further needed is a surface coating that may be easily applied to the surface, especially to an aircraft, and which retains its functionality under a variety of environmental conditions, such as those typically encountered by a commercial or military aircraft. What is further needed is a method of applying the surface coating to at least a portion of a vehicle, such as an aircraft.

SUMMARY OF THE INVENTION

The invention is a polysiloxane(amide-ureide) coating capable of inhibiting the accumulation of ice upon the surface of a substrate, a process of producing the polysiloxane(amide-ureide), and a method of coating vehicles, particularly aircraft, with the polysiloxane(amide-ureide) coating. The polysiloxane(amide-ureide) forms a durable, long lasting, anti-ice coating when employed upon a substrate. When coated upon a substrate, the polysiloxane (amide-ureide) coating disrupts bonding between the ice and the coated substrate. Moreover, when ice does form, the coating disrupts the hydrogen bonding between the ice and the coated surface, thereby diminishing the ability of the ice to adhere to the surface. The ability of the coating to adhere to surfaces, and the ability of the coating to inhibit the formation of ice upon coated surfaces, makes the polysiloxane(amide-ureide) particularly useful for inhibiting the formation of ice on aircraft or other vehicles. The polysiloxane(amide-ureide) has the general formula:

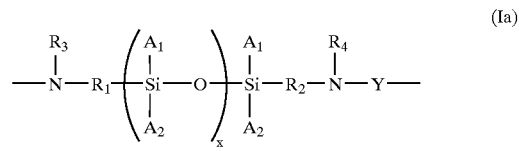
(Ia)

wherein $R_1$ and $R_2$ are independently selected from the group consisting of $C_1$ to $C_{10}$ alkyls, aryls, and polyaryls;

$R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles;

$A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles, and are preferably methyl;

wherein the alkyls may be linear or branched, saturated or unsaturated, halogenated or non-halogenated; aryls are preferably selected from $C_6$, $C_{10}$, and $C_{14}$ aryls and may be substituted or non-substituted, including alkylaryls and halogenated aryls; polyaryls are two or more aryls linked by at least one carbon-carbon bond and are preferably selected from biphenyl and terphenyl; cycloaliphatics may be saturated or unsaturated, halogenated or non-halogenated; heterocycles may be saturated or unsaturated, halogenated or non-halogenated; and alkylaryls may be linear or branched, saturated or unsaturated, halogenated or non-halogenated;

x is a number from 1 to 1000, preferably between about 200 and 500; and,

Y is selected from a substituted dicarboxyl residue and a diisocyanate residue wherein preferably about 40% to about 60% of the Y component within the polymer is the substituted dicarboxyl residue and the remaining portion of the Y component within the polymer is the diisocyanate residue, and wherein preferably greater than about 50% of the Y components are non-linear. It is the combination of both the dicarboxyl residues and the diisocyanate residues in the same polymer backbone that gives the desirable properties relative to interchain strength and ice inhibiting properties.

A preferred polysiloxane(amide-ureide) is represented by the formula:

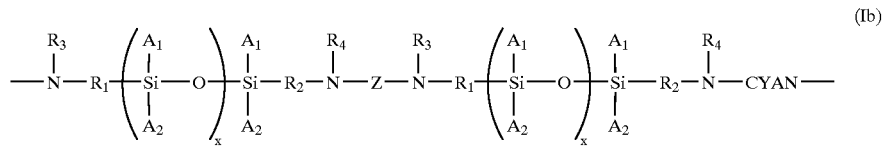

(Ib)

wherein each of $R_1$, $R_2$, $A_1$, $A_2$, $R_3$, $R_4$, and x are as defined above, and Z is a dicarboxyl residue and CYAN is a non-linear diisocyanate residue.

The polysiloxane(amide-ureide) is formed by reacting a diamine-terminated polysiloxane, a halide substituted dicarboxylic acid, and a diisocyanate. The beginning diamine-terminated polysiloxane has the general formula:

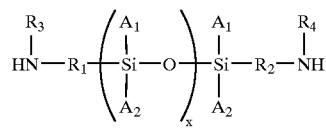

(II)

wherein $R_1$, $R_2$, $R_3$, $R_4$, $A_1$, $A_2$, and x are as defined above.

The halide substituted dicarboxylic acid is a low molecular weight α,ω-dicarboxlic acid wherein the hydroxyl from each carboxylic acid component has been replaced with a halide constituent, typically chloride, and where the dicarboxylic acid may be as long as a 10 carbon dicarboxylic acid. At least a portion of the substituted dicarboxylic acids are preferably selected from unsaturated acids, such as fumaryl, succinyl, phthalyl, terephthalyl and maleyl halides, and more preferably fumaryl chlorides and maleyl chlorides.

To prepare the preferred polymer, excess amine-terminated polysiloxane is first reacted with a dicarboxylic halide to form a polyamide trimer intermediate. The intermediate is reacted with a diisocyanate to form the polysiloxane(amide-ureide) of formula (Ib). Use of fumaryl halides, phthaloyl halides, and maleyl halides as the dicarboxylic acid halides and use of the non-linear diisocyanate result in a polysiloxane(amide-ureide) with a decidedly non-linear orientation. Thus, the resulting polymer (Ib) contains functional amide groups, functional urea groups, and is amorphous rather than crystalline in nature, due to the non-linear orientation of the polymer molecules. Each of the amide functionality, the urea functionality, and the non-linearity of the polymer improve the polymer's strength or anti-icing properties. Furthermore, the amide/urea moieties create crystallinity within the polymer via intermolecular hydrogen bonding which, in conjunction with the amorphous nature of the polysiloxane and the non-linearity of the diacid or diisocyanate, create a toughened polymer with enhanced physical properties.

The polysiloxane(amide-ureide) forms a durable, continuous coating when applied to a surface of a vehicle, such as the aluminum or titanium skin on the external surface of an aircraft. The polysiloxane(amide-ureide) also forms a suitable coating layer when applied to a painted surface or to composite structure such as resin matrices containing graphite, carbon, or glass fibers. Aircraft, ships, and other vehicles coated with the polysiloxane(amide-ureide) remain relatively free of ice. If ice does form upon the coated surface, adhesion of ice to the surface is minimal, such that the ice is removed from the surface by any slight application of physical force. The coating is particularly useful to coat the lift and control surfaces of an aircraft to prevent or slow the formation of ice on these surfaces. The coating is also particularly useful for coating the inlets of aircraft to prevent the accumulation of ice on the inlets.

Any ice that does form tends to fall off under the aerodynamic conditions related to operation of an aircraft. Airplanes coated with the polysiloxane(amide-ureide) have improved handling and safety characteristics under conditions which make the surfaces of the airplane otherwise susceptible to icing.

Similarly, ice that forms on other surfaces, such as the roof of a car or the smooth surface of a building, is easily removed by shearing action.

DETAILED DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

Figure 1:
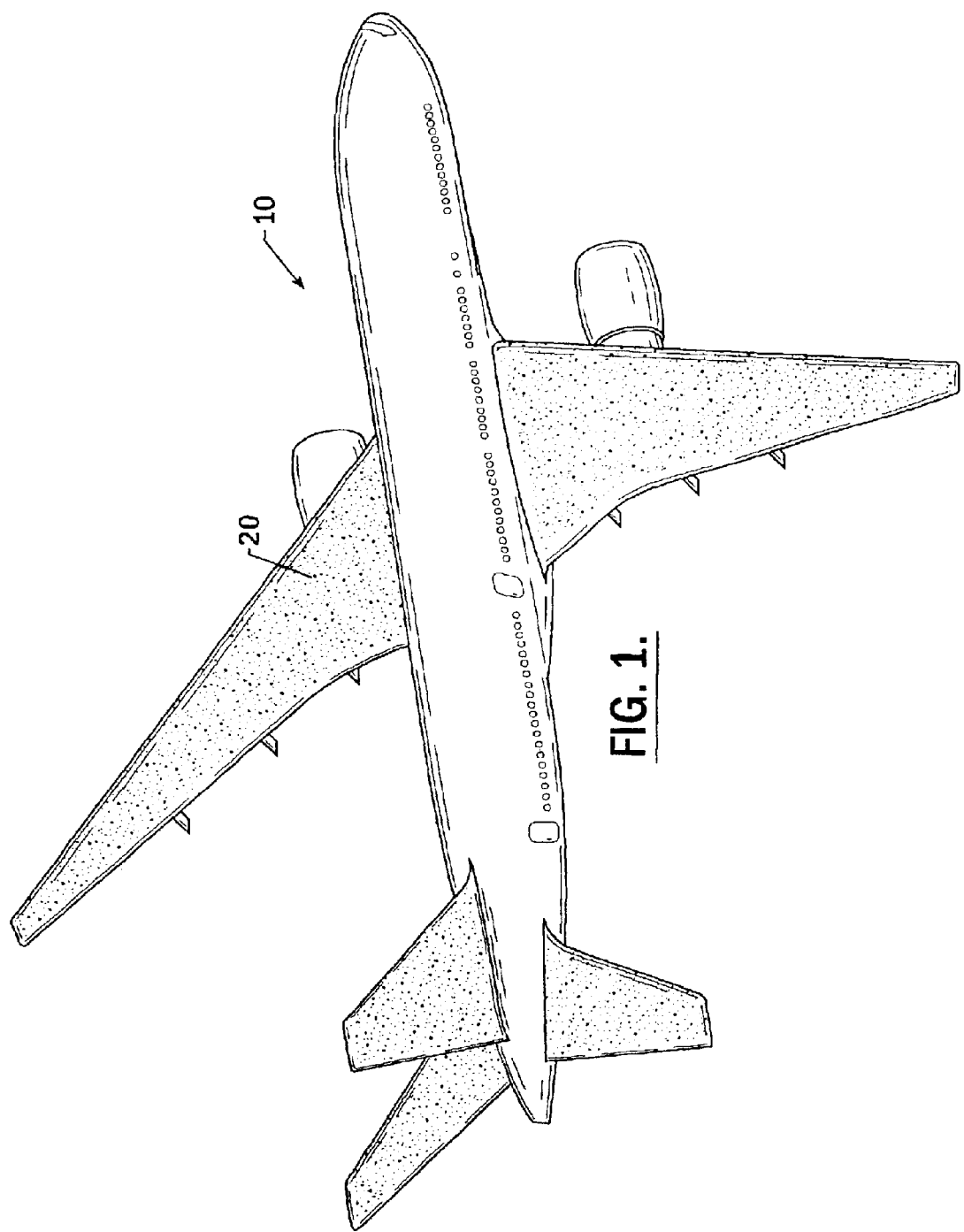
FIG. 1 is an outline rendering of a commercial airliner having surfaces coated with an anti-icing composition in accordance with one embodiment of the invention.

The present invention now will be described more fully with reference to various embodiments of the invention. This invention may, however, be embodied in many different forms and should not be construed as limited to the embodiments set forth herein; rather, these embodiments are provided so that this disclosure will be thorough and complete, and will fully convey the scope of the invention to those skilled in the art.

The invention is an improved surface coating which inhibits the ability of ice to form upon a coated surface. The surface coating is particularly effective when applied to coated or uncoated metal, including aerospace alloys of aluminum, steel, or titanium or to resin composites having glass, ceramic, or carbon fiber reinforcement and is particularly useful for inhibiting the formation of ice upon the control or aerodynamic lifting surfaces of aircraft or space vehicles. The coating also forms an effective ice inhibitor when used on a wide variety of substrate materials other than the preferred aluminum, titanium or carbon composite, such as glass.

The polysiloxane(amide-ureide) has the general formula:

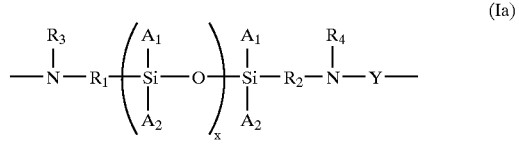

(Ia)

wherein $R_1$ and $R_2$ are independently selected from the group consisting of $C_1$ to $C_{10}$ alkyls, aryls, and polyaryls;

$R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles;

$A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles, and are preferably methyl;

x is a number from 1 to 1000, preferably between about 200 and 500; and,

Y is selected from a substituted dicarboxyl residue and a diisocyanate residue wherein preferably about 40% to about 60% of the Y component within the polymer is the substituted dicarboxyl residue and the remainder of the Y component within the polymer is the diisocyanate residue, and wherein preferably greater than about 50% of the Y components are non-linear.

The alkyls may be linear or branched, saturated or unsaturated, halogenated or non-halogenated. The aryls are preferably selected from $C_6$, $C_{10}$, and $C_{14}$ aryls and may be substituted or non-substituted, including halogenated or non-halogenated aryls. The aryls may include alkylaryls and the alkylaryls may be linear or branched, saturated or unsaturated, halogenated or non-halogenated. The polyaryls are two or more aryls linked by at least one carbon-carbon bond and are preferably selected from biphenyl and terphenyl. The polyaryls may be linear or branched, and substituted or non-substituted, including halogenated or non-halogenated. The heterocycles may be saturated or unsaturated, halogenated or non-halogenated.

The polysiloxane(amide-ureide) is formed by reacting an amine-terminated polysiloxane, a halide substituted dicarboxylic acid, and a diisocyanate.

A preferred coating is comprised of a polysiloxane(amide-ureide) polymer having the general formula:

wherein each of $R_1$, $R_2$, $A_1$, $A_2$, $R_3$, $R_4$, and x are as defined above, and Z is a dicarboxyl residue and CYAN is a diisocyanate residue.

The preferred polysiloxane(amide-ureide) is created by first reacting a high molecular weight diamine-terminated polysiloxane as shown below in structure (II) with a halide substituted dicarboxylic acid, examples of which are shown as structures (IV), to form a polyamide intermediate, shown below as structure (III). The polyamide intermediate (III) is then reacted with a non-linear diisocyanate shown as structure (V) to form the polysiloxane(amide-ureide) (Ib). Each of the reactants and each of the process steps are described in greater detail below.

The beginning amine-terminated polysiloxane has the general formula:

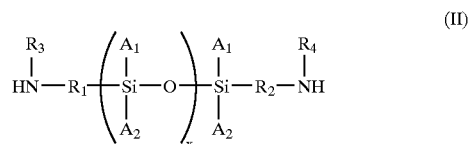

(II)

wherein $R_1$, $R_2$, $R_3$, $R_4$, $A_1$, $A_2$, and x are as defined above. If any of the $R_1$, $R_2$, $R_3$, $R_4$, $A_1$, $A_2$ groups are aryl, then those aryl groups are preferably phenyl.

$A_1$ and $A_2$ need not be regularly repeating patterns of hydrogen, alkyl, aryl, or polyaryl groups. For instance, the polysiloxane (II) may have a wide variety of randomly dispersed $A_1$ and $A_2$ groups throughout the length of the polysiloxane.

Although the number of repeat units, x, in the polysiloxane (II) may be as low as one, the average is generally between about 200 and 1,000, and is preferably between about 200 and 500. The polysiloxane may be linear or branched. When branched, the $R_1$, $R_2$, $A_1$, or $A_2$ groups are a site of branching. Branching is one method of obtaining a crosslinked end-product.

Polysiloxane diamines such as those of structure (II) are commercially available from United Chemical Technologies, Inc. in Bristol, Pa., and also from Dow Chemical Co., Midland, Mich. The preferred polysiloxanes are linear, though branched polysiloxanes may also be used.

A halide substituted dicarboxylic acid ("diacid halide") is reacted with the polysiloxane (II) to form the intermediate polyamide (III):

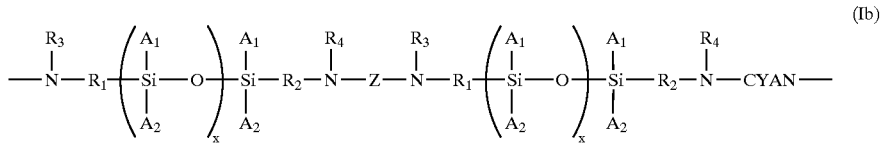

(Ib)

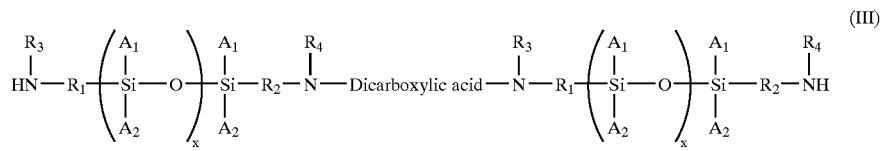

(III)

The halide substituted dicarboxylic acid used in the reaction is a low molecular weight dicarboxylic acid wherein the hydroxyl group from each carboxylic acid component has been replaced with a halide constituent. The dicarboxylic acid is either an aliphatic or aromatic compound with halogen substituted carboxylic acid endgroups. Preferred aliphatic dicarboxylic acid components have ten or less carbons, with examples of the diacid halides including but not limited to malonyl halides, succinyl halides, glutaryl halides, adipyl halides, sebacyl halides, maleyl halides, and fumaryl halides. Examples of aromatic substituted dicarboxylic acids include terephthalic acid or phthalic acid. Polyfunctional substituted dicarboxylic acids may be used with the invention to promote crosslinking.

Examples of commercially available aliphatic substituted dicarboxylic acid components are fumaryl chloride, succinyl chloride, and maleyl chloride, each available from Aldrich™ of Milwaukee, Wis.

Preferably, at least a portion of the substituted dicarboxylic acids, Z, used to form the polysiloxane(amide-ureide) (Ib) are selected from fumaryl halides and maleyl halides. The fumaryl and maleyl halides are trans and cis variations of one another having the following formulas:

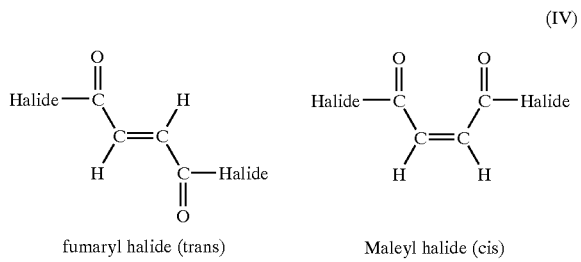

(IV)

fumaryl halide (trans)     Maleyl halide (cis)

The incorporation of the fumaryl halide and/or the maleyl halide act to limit the degree of freedom of the polyamide (III) produced by the reaction of the polysiloxane diamine (II) and the dicarboxylic acid (IV). When reacted, the amine groups of the diamine polysiloxanes (II) displace the halides and bond with the carboxyl carbon of the fumaryl halides or maleyl halides. Once bonded, the unsaturated carbon linkage prevents the resulting polyamide (III) from rearranging into a stable spatial orientation, and is particularly useful in preventing the polyamide (III) from taking on a linear or near-linear orientation.

The degree of linearity of the polyamide (III), and therefore of the resulting polysiloxane(amide-ureide) (Ib) is determined by the relative amounts of fumaryl halide and maleyl halide in relation to saturated halide substituted dicarboxylic acids (IV) used in the formation of the polyamide. The addition of saturated acid halides, such as succinyl chloride, allow the polyamide (III) to rotate and orient about the succinyl saturated carbon-carbon bond, thus allowing the polyamide (III) and resulting polysiloxane (amide-ureide) (Ib) to orient in a near-linear orientation. Saturated acid halides such as succinyl, malonyl or other saturated acid halides may be used in conjunction with the unsaturated acid halides to create a polyamide (III) having a combination of crystalline and amorphous regions in order to control the toughness of the resultant polysiloxane(amide-ureide) (Ib).

The polysiloxane(amide-ureide) (Ib) shows improved anti-icing properties when formed into an amorphous structure with some small amount of crystallinity for enhanced toughness. Maleyl or fumaryl halide cause the structure of the polymer to be non-linear about the carbon-carbon double bonds in the maleyl and fumaryl entities. The combined maleyl and fumaryl, or other unsaturated diacid halide, content is therefore preferably greater than 50 mol % of the dicarboxylic acid halide used in preparation of the polysiloxane(amide-ureide) (Ib). It is more preferable that the unsaturated diacid halides comprise between about 75% and 99% of the diacid halides. The disorientation caused by the fumaryl halide and maleyl halide give the resulting polysiloxane(amide-ureide) an amorphous structure, but the introduction of a saturated diacid halide helps to increase the toughness of the polymer compared with linear polymers having amide or ureide moieties. The non-linear orientation of the polymer makes the polysiloxane(amide-ureide) less brittle than polyureides produced with linear diisocyanates such as methylene diphenyl diisocyanate. Being less brittle, the polysiloxane(amide-ureide) is more durable than industrially available polyureides, and is able to resist the environment associated with ice formation without being damaged.

The formation of the polyamide intermediate (III) takes place by reacting an excess of the diamine polysiloxane (II) with a given amount of dicarboxylic acid halide (IV), preferably in a molar ratio of about 2:1. The reaction is generally performed in a solvent such as methylene chloride, tetrahydrofuran, toluene or methylethyl ketone. The amine-terminated polysiloxane (II) is added to the diacid halide (IV) in the presence of an acid acceptor such as triethylamine, at elevated temperature, for instance 50° C. As such, the average resulting polyamide intermediate (III) has amine endgroups:

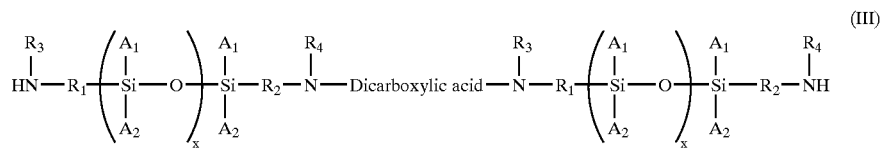

(III)

Various polymerization products will result from the combination of the diamine polysiloxane (II) with the given amount of dicarboxylic acid halide (IV). However, based on stoichiometry, the intermediate (III) is what will be predominantly obtained. Thus, based upon the best known average molecular weight values, and the functionality of the reactants, a large percentage of the intermediate (III) will be formed.

After formation of the polyamide intermediate (III), the polyamide intermediate is reacted with a non-linear diisocyanate (V) to form the polysiloxane(amide-ureide) (Ib).

lene 1,2-diisocyanate, cyclohexylene 1,4-diisocyanate, 1-methyl cyclohexane 2,4-diisocyanate, 2,4-toluene diisocyanate, hexamethylene-1,6-diisocyanate, heptamethylene-1,7-diisocyanate, 1,3-cyclopentene diisocyanate, and 1,3-cyclohexane diisocyanate, most of which are commercially available from Aldrich™ of Milwaukee, Wis. Other exemplary diisocyanates include those described in U.S. Pat. Nos. 6,008,410 and 6,353,135.

The polysiloxane(amide-ureide) resulting from the combination of the polyamide (III) and diisocyanate (V) has the general formula:

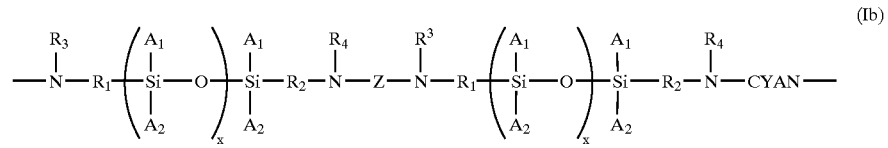

(Ib)

The non-linear diisocyanates generally have the structure of:

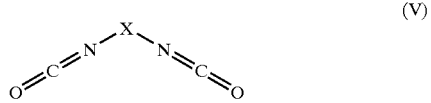

(V)

where X is an aliphatic or aromatic moiety and the two isocyanate groups are bound to the X moiety so as to be positioned in a non-linear relationship with respect to one another. The amine endgroups of the polyamide (III) react with the isocyanate endgroups of the non-linear diisocyanates (V) to form urea linkages.

The diisocyanates (V) are reacted in a solvent bath with the polyamide intermediate (III). The reaction preferably occurs directly after reacting the polysiloxane (II) with the diacid halide (IV) within the same solvent bath, but at room temperature, rather than 50° C.

As with the non-linear dicarboxylic acids, the purpose of utilizing a non-linear diisocyanate is to give the resulting polysiloxane(amide-ureide) an overall non-linear orientation, which results in a polymer that is more amorphous and less crystalline. Non-linear aliphatic or aromatic diisocyanates may be used, with ortho or meta oriented aromatic diisocyanates being preferred.

The functionality of the diisocyanates is gained from the dual isocyanate groups being located in a non-linear relationship around an aliphatic or aromatic carbon structure. Polyisocyanates, i.e., those compounds having three or more isocyanate groups, may be used for enhanced crosslinking of the resulting polysiloxane(amide-ureide) (Ib). Otherwise, the diisocyanates may be unsubstituted or substituted with groups such as alkyl, alkoxy, halogen, benzyl, allyl, unsubstituted or substituted aryl, alkenyl, alkinyl, amide, or combinations thereof.

Examples of acceptable diisocyanates include 1,5-naphthalene diisocyanate, 4,4-diphenyl-methane diisocyanate, tetra-alkyl-diphenyl methane diisocyanate, 1,3-phenylene diisocyanate, 1,4-phenylene diisocyanate, butane-1,4-diisocyanate, hexamethylene 1,6-diisocyanate, 2,2,4-trimethyl-hexamethylene 1,6-diisocyanate, 2,4,4-trimethyl-hexamethylene 1,6-diisocyanate, cyclohexane-1, 4-diisocyanate, xylilene diisocyanate, dicyclohexyl-methane-4,4'-diisocyanate, methyl-cyclohexane diisocyanate, 1,4-tetramethylene diisocyanate, hexamethylene diisocyanate, 1,3-trimethylene diisocyanate, metaxylene diisocyanate, decamethylene 1,10-diisocyanate, cyclohexywith $R_1$, $R_2$, $R_3$, $R_4$, $A_1$, $A_2$, x as defined above, and wherein Z represents a dicarboxylic acid group; and CYAN represents a diisocyanate group.

Various permutations of the invented polymer, general formula (Ia), may be produced by using the above described reactants and the above described reaction conditions, but by changing the order of reaction from the order used to create the preferred embodiment (Ib).

For instance, a polysiloxane (II) and a diisocyanate (V) may be reacted with a diacid halide in a common solvent solution such that the molar ratios of the reactants are 2:1 (polysiloxane:diisocyanate) and 2:1 (combination of polysiloxane and diisocyanate:diacid halide). The reaction results in amine-terminated products. The amine-terminated products are reacted with a second diacid halide, which may the same or different from the first diacid halide, to form a random copolymer(amide-ureide).

In another embodiment, it is possible to create block copolymers of the polysiloxane(amide-ureide). To create the block copolymer, a first amine-terminated polysiloxane (II) is reacted with a diacid halide (IV), preferably in a molar ratio of 2:1 (polysiloxane:diacid halide) to form a first product. Separately, a second amine-terminated polysiloxane (II) is reacted with a diisocyanate (V), preferably in a molar ratio of 2:1 (polysiloxane:diisocyanate) to form a second product. The two products (each amine-terminated) are then reacted with a second diacid halide, which may the same or different from the first diacid halide, to result in a block copolymer(amide-ureide).

The invented polysiloxane(amide-ureide)s have several functional aspects which combine to make the polysiloxane (amide-ureide)s superior, durable, and long lasting anti-icing agents which can be used on a wide variety of surfaces.

It has been found that the urea groups of the polysiloxane (amide-ureide)s act to disrupt the hydrogen bonding between molecules of water, which inhibits the formation of ice and also greatly diminishes the adhesion of ice to the polysiloxane(amide-ureide)s when the polysiloxane(amide-ureide)s are used as a coating layer upon a substrate. So, the polysiloxane(amide-ureide)s anti-icing agent acts first to inhibit the formation of ice, and secondly to inhibit the ability of ice to adhere to a coated surface. The polysiloxane portion of the polymer chain is hydrophobic, hence water does not readily sheet out, but tends to bead up. The urea moiety, in weakening the hydrogen bonding of the water molecule causes the resultant ice to have a weak structure which prevents water from forming a strong ice crystal layer upon a coating of the polysiloxane(amide-ureide)s, thus allowing it to be easily broken away from the coating.

The polysiloxane(amide-ureide) may be applied as a continuous coating upon a wide variety of surfaces, particularly metal surfaces such as aluminum or titanium. The coating may also be suitably applied to painted surfaces or to composite surfaces such as resin matrices of graphite or glass fibers. Because the coating is continuous, water cannot penetrate the coating. It is believed that the penetration of water into sintered coatings, such as Teflon™, result in the gradual degradation in icephobic properties of such sintered coatings. There is no such related degradation in the invented polysiloxane(amide-ureide).

Thus, the polysiloxane(amide-ureide) has anti-icing properties not previously found in polyamides. It has degradation resistance not previously found in polyureides. And, it has physical toughness and durability not previously found in polyamides or polyureides.

The polysiloxane(amide-ureide) may be applied to a substrate in a number of ways. For instance, it may be applied to substrate surfaces by simply spraying the polymer composition upon a substrate. As one component spray, a solution of the polysiloxane(amide-ureide) in methylene chloride/toluene mixture (1:1 ratio) is sprayed onto a substrate to be coated. After the solvent is removed, a uniform film of polymer is left behind.

As a two component system, the amine-terminated polyamide intermediate (III) is dissolved in the methylene chloride/toluene mixture and in another mixture of methylene chloride/toluene is dissolved the stoichiometric amount of diisocyanate (V). The two mixtures are combined in a common spray nozzle and mixed while being sprayed onto a dry substrate under inert atmosphere conditions to form a polysiloxane(amide-ureide) coating on the substrate.

Alternatively, the polysiloxane(amide-ureide) may be dissolved in a solvent, such as methylene chloride at a concentration of about 50 percent solids and sprayed onto the substrate. The solvent, being low boiling, evaporates rapidly and a film of polysiloxane(amide-ureide) is left behind.

Alternatively, the polyamide intermediate (III) is mixed with a methylene chloride solution of a polyisocyanate (V) at a mixing nozzle of a spray gun and ejected onto the substrate. This process results in a crosslinked polymer, which cures within a few minutes to a firm crosslinked film.

In a one component spray, the polysiloxane(amide-ureide) is capable of being handled or walked upon as soon as the solvent has all evaporated. Use of a heat source, such as hot air or infrared lamps, will accelerate the solvent removal. In the two component system, the polysiloxane(amide-ureide) forms almost as soon as the two parts are mixed and sprayed onto the substrate. Again use of hot air or heat lamps will facilitate solvent removal to leave behind a useable film.

The coating is a clear film coating and may be applied onto a wide variety of surfaces, including painted surfaces. Alternatively, the coating may be pigmented by mixture of one or more of the reaction components with a suitable pigment in a colloid mill. The pigmented coating may then be used as a paint.

The polysiloxane(amide-ureide) is hydrophobic and tends to displace any moisture upon surfaces when applied, therefore the polysiloxane(amide-ureide) may be applied successfully to wet or damp surfaces. The polymer can be applied anywhere between about minus 40° F. and about 250° F., and the polymer coating is stable to about 350° F. The coating may be applied in a single layer having any desired thickness, eliminating the need for multi-coat applications.

Figure 2:
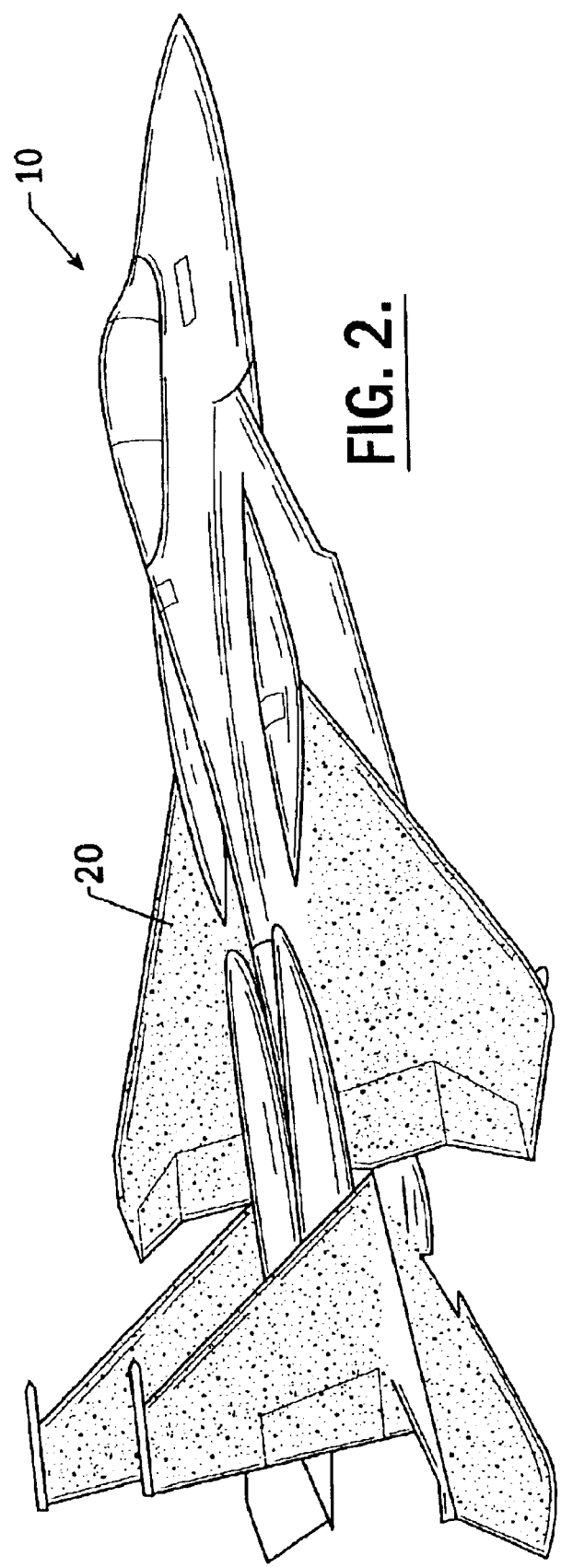
FIG. 2 is an outline rendering of a military aircraft having surfaces coated with an anti-icing composition in accordance with one embodiment of the invention.

Referring to FIGS. 1 and 2, the polysiloxane(amide-ureide) is particularly useful for application to aluminum or titanium surfaces and provides a coating which may be used to de-ice or to prevent ice formation upon the lift, stabilizing, and control surfaces 20 of an aircraft 10. The entire surface of an aircraft 10 may be coated with the polysiloxane(amide-ureide) or just the lift, stabilizing, and/or control surfaces 20 or other selected surfaces may be coated. Prevention of ice formation is of critical importance because even a slight buildup of ice upon the wings or other lift surfaces of the aircraft can cause dramatic alterations in the aerodynamic performance of the lift surfaces. Similarly, control surfaces of the aircraft must remain free of ice buildup which could block the movement and impair the operation of those control surfaces. Additionally, prevention of ice formation reduces the overall weight of the aircraft, thereby improving safety, performance, and fuel efficiency. Similar advantages are provided by coating at least some portions of the outer surface of other vehicles, such as missiles, ships, and automobiles.

The coating may be applied as an appliqué by first depositing the coating, as described above, upon a relief surface such as Teflon™. When dry, the coating may be removed from the release surface and used in an appliqué process.

The usefulness of the polysiloxane(amide-ureide) is not limited to metal surfaces. The polysiloxane(amide-ureide) finds use as a coating on any of a wide variety of substrates such as carbon composites, and even wood or asphalt, a number of which may be applications unrelated to aircraft.

EXAMPLES

Example 1

Production Method for Polysiloxane(Amide-ureide)

The reaction between α,ω-diaminopolysiloxane (MW 2,300), dissolved in methylene chloride, with a tertiary amine, e.g., triethylamine, as an acid acceptor, and fumaryl chloride in a molar ratio of 2:1 resulted in the formation of a diamine-terminated poly (siloxane diamide).

The tertiary amine hydrochloride was filtered off and the resultant diamide was reacted with toluene-2,4-diisocyanate in a 1:1 molar ratio of diamide to diisocyanate to form a polysiloxane(amide-ureide) with repeated trans structure about the double bond of the fumaryl moiety. The ratio of amine-terminated poly(siloxane amide) to isocyanate was dictated by the functionality of the isocyanate, i.e., a tri-isocyanate would require two moles of the poly(siloxane amide) to one mole of tri-isocyanate.

Example 2

First Alternative Production Method for Polysiloxane(Amide-ureide)

Into a two liter, three-necked round bottom flask was added one mole of fumaryl chloride dissolved in 500 mils of methylene chloride. A dry, inert atmosphere was maintained by means of a drying tube and nitrogen purge. To this solution was added, slowly and with stirring, two moles of α,ω-diaminopolysiloxane (MW 26,000) dissolved in 500 mils of methylene chloride and containing two moles of triethylamine as an acid acceptor. After the addition was completed, the mixture was heated to 50° C. for one hour and the amine hydrochloride was filtered off, leaving one mole of the amine-terminated fumaryl polyamide in solution. The one mole of polyamide was added to one mole of 2,4-toluene diisocyanate dissolved in 100 mils of methylene chloride with a precaution of maintaining a dry, inert atmosphere. After allowing the reaction to proceed for 24 hours at room temperature, the methylene chloride solution of the polysiloxane(amide-ureide) was ready to be used as a coating material on the substrate needing ice protection.

Example 3

Second Alternative Production Method for Polysiloxane(Amide-ureide)

One mole of succinyl chloride, one mole of fumaryl chloride, and four moles of α,ω-diaminopolysiloxane (MW 26,000) were reacted to yield polyamides with a trans amide component around the double bond of the fumaryl moiety and a linear amide component around the single bond of the succinyl moiety. Thus, the linearity of the polyamide may be adjusted prior to reaction with the diisocyanate by controlling the relative amounts of saturated and unsaturated acid halide, i.e. the relative amounts of fumaryl chloride versus succinyl chloride.

Example 4

Third Alternative Production Method for Polysiloxane(Amide-ureide)

Two moles of fumaryl chloride and one mole of propylamine-terminated polydimethylsiloxane were reacted. The product was reacted with two moles of butylamine-terminated polydimethylsiloxane. That product was then reacted with one mole of toluene-2,4-diisocyanate to result in a block copolymer polysiloxane(amide-ureide).

Example 5

Fourth Alternative Production Method for Polysiloxane(Amide-ureide)

Two moles of α,ω-diaminopolysiloxane (MW 26,000) was reacted with one mole of fumaryl chloride under conditions as described in Example 2 to form a first product. One mole of toluene-2,4-diisocyanate was reacted with two moles of α,ω-diaminopolysiloxane (MW 2,300) under conditions as described in Example 2 to form a second product. These products (each amine-terminated) were then reacted with two moles of fumaryl chloride to result in a block copolymer(amide-ureide).

Example 6

Ice Adhesion Test Results

Figure 3:
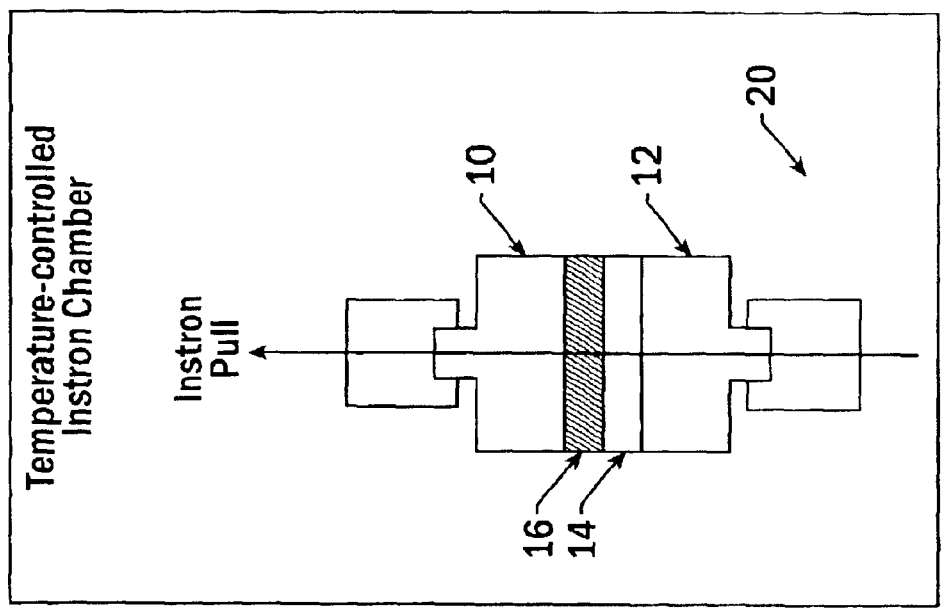
FIG. 3 is a diagram of a temperature controlled Instron™ tester used to test the adhesive strength of ice bound to various coated surfaces.

Ice adhesion tests were performed by freezing ice between two surfaces in a temperature-controlled Instron tester and then forcing the surfaces apart until the ice reached cohesive or adhesive failure. Referring to FIG. 3, an upper aluminum plate 10 and lower aluminum plate 12 are positioned directly opposite and facing one another. The lower plate 12 is coated with a coating layer 14. Then water is positioned between the upper plate 10 and the coating layer 14, where it is allowed to freeze into a solid ice layer 16 in a temperature controlled chamber 20 chilled to 20° F. The aluminum plates were pulled apart at a pull rate of 0.02 in/min from one another under carefully measured conditions until the ice separates from one of the surfaces or suffers cohesive failure. The tension at separation is noted. The type of ice failure (adhesive vs. cohesive) is also noted.

For this example, 4 different substances were tested in the Instron™. The results are shown in Table 1 below. The samples were as follows:

TABLE 1

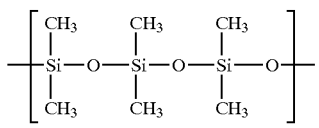

A. Silicone Rubber

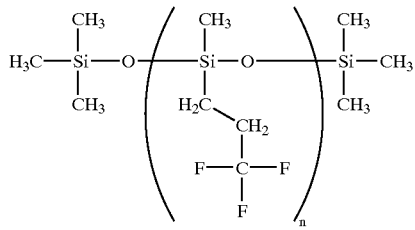

B. Fluorinated Silicone MW = 4,600

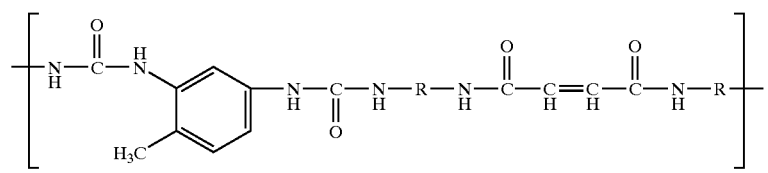

C. Polysiloxane (amide-ureide), Example 2

TABLE 1-continued

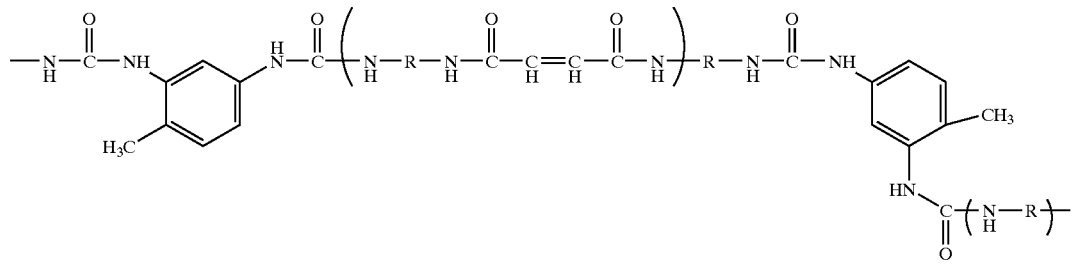

D. Polysiloxane (amide-ureide), Example 5

| Surface | Ice Thickness (in.) | Breakforce (lb./in²) | Number of Runs | Standard Deviation | Adhesive/ Cohesive Failure (%) |
|---|---|---|---|---|---|
| A | 0.03 | 7 | 3 | 3.4 | 100/0 |
|   | 0.01 | 5 | 3 | 0.6 | 100/0 |
| B | 0.03 | 91 | 5 | 52.8 | 10/90 |
|   | 0.01 | 9 | 3 | 10.1 | 97/3 |
| C | 0.03 | 5 | 3 | 0.58 | 100/0 |
|   | 0.01 | 10 | 4 | 2.6 | 100/0 |
| D | 0.03 | 0 | 3 | 0 | 100/0 |
|   | 0.01 | 2 | 3 | 2.6 | 100/0 |

As shown, the polysiloxane(amide-ureide) samples C and D had very favorable ice release characteristics, releasing at 5 lb/in² and 0 lb/in² respectively for ice thicknesses of 0.03 inches, and 10 lb/in² and 2 lb/in² respectively for ice thicknesses of 0.01 inches. Note that the silicone rubber coating A had very favorable ice shedding characteristics, but silicone rubber does not form a tough coating and is unsuitable for application to aircraft surfaces, etc. The polysiloxane(amide-ureides) showed significantly better ice shedding characteristics compared with the fluorinated siloxane samples, which are typically considered to be highly ice phobic.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A polymer which inhibits the ability of ice to adhere to a surface of a physical object, said polymer formed from repeat units having the formula:

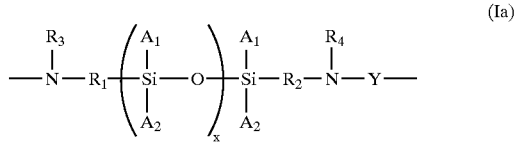

(Ia)

wherein for each repeat unit of the polymer, $R_1$ and $R_2$ are independently selected from the group consisting of $C_1$ to $C_{10}$ alkyls, aryls, and polyaryls;

for each repeat unit of the polymer, $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles;

for each repeat unit of the polymer, $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles;

for each repeat unit of the polymer, x is a number from 1 to 1000; and for each repeat unit of the polymer, Y is selected from a dicarboxyl residue and a non-linear diisocyanate residue, and wherein the polymer comprises at least one repeat unit where Y is a dicarboxyl residue and at least one repeat unit where Y is a nonlinear diisocyanate residue.

2. The polymer of claim 1 wherein the dicarboxyl residue is selected from fumaryl moieties, maleyl moieties, saturated $C_2$ to $C_{10}$ dicarboxyl moieties, and partially-saturated $C_4$ to $C_8$ dicarboxyl moieties.

3. The polymer of claim 1, wherein at least one of $R_1$ and $R_2$ are selected from the group consisting of halogenated alkyls and halogenated aryls.

4. The polymer of claim 1 wherein x is a number from 200 to 1000.

5. A coating which inhibits the ability of ice to adhere to a surface of a physical object, said coating comprising a polymer formed from repeat units having the formula:

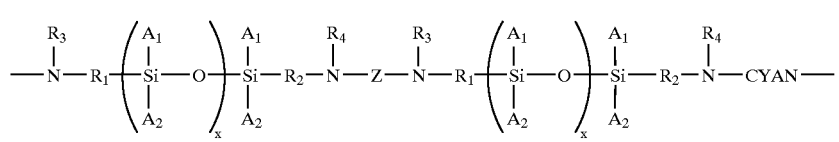

(Ib)

wherein for each repeat unit of the polymer, $R_1$ and $R_2$ are independently selected from the group consisting of $C_1$ to $C_{10}$ alkyls, aryls, and polyaryls;

for each repeat unit of the polymer, $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles;

for each repeat unit of the polymer, $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles;

for each repeat unit of the polymer, x is a number from 1 to 1000; and for each repeat unit of the polymer, Z is a dicarboxyl residue; and for each repeat unit of the polymer, CYAN is a non-linear diisocyanate residue.

6. The coating of claim 5 wherein Z is selected from the group consisting of fumaryl moieties, maleyl moieties, saturated $C_2$ to $C_{10}$ dicarboxyl moieties, and partially-saturated $C_4$ to $C_8$ dicarboxyl moieties.

7. The coating of claim 6, wherein greater than approximately 50% of the Z components of the polymer are fumaryl moieties.

8. The coating of claim 5, wherein CYAN is selected from the group consisting of unsaturated aliphatic diisocyanates.

9. The coating of claim 5, wherein at least one of $R_1$ and $R_2$ are selected from the group consisting of halogenated alkyls and halogenated aryls.

10. The coating of claim 5 wherein x is a number from 200 to 1000.

11. A method of producing a polysiloxane(amide-ureide) comprising reacting at least one diamine terminated polysiloxane with one of the components selected from at least one halide substituted dicarboxylic acid and at least one non-linear diisocyanate to form a first product, and thereafter reacting the first product with the other of the components selected from the at least one halide substituted dicarboxylic acid and the at least one non-linear diisocyanate.

12. The method of claim 11, wherein the polysiloxane (amide-ureide) is produced by reacting the at least one diamine terminated polysiloxane with the at least on dihalide substituted dicarboxylic acid to form the first product, and subsequently reacting said first product with the at least one non-linear diisocyanate.

13. The method of claim 12, wherein the at least one diamine terminated polysiloxane is reacted with the at least one dicarboxylic acid in a molar ratio of approximately 2:1 (polysiloxane:dicarboxylic acid).

14. The method of claim 11, wherein the at least one amine terminated polysiloxane has the formula:

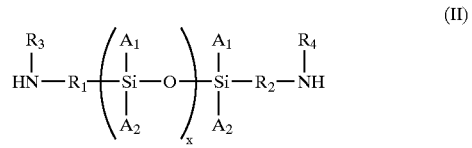

(II)

wherein $R_1$ and $R_2$ are independently selected from the group consisting of $C_1$ to $C_{10}$ alkyls, aryls and polyaryls;

$R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles;

$A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; and x is a number from 1 to 1000.

15. The method of claim 14, wherein at least one of $R_1$ and $R_2$ are selected from the group consisting of halogenated alkyls and halogenated aryls.

16. The method of claim 11, wherein the at least one dihalide substituted dicarboxylic acid is a low weight dicarboxylic acid wherein the hydroxyl from each carboxylic acid component has been replaced with a halide constituent.

17. The method of claim 11, wherein the polysiloxane (amide-ureide) is produced by reacting the at least one diamine terminated polysiloxane with the at least one non-linear diisocyanate to form the first product, and subsequently reacting the first product with the at least one halide substituted dicarboxylic acid.

18. The method of claim 17, wherein the at least one diamine terminated polysiloxane is reacted with the at least one non-linear diisocyanate in a molar ratio of about 2:1 (polysiloxane:diisocyanate).

19. The method of claim 11, wherein the at least one halide substituted dicarboxylic acid is selected from the group consisting of fumaryl chloride, maleyl chloride, saturated $C_4$ to $C_8$ dicarboxyl chlorides, and mixtures thereof; and, wherein the mixture of the chloride substituted dicarboxylic acids is at least 50 mol % fumaryl chloride.

20. The method of claim 19, wherein the mixture of the chloride substituted dicarboxylic acids is at least 80 mol % fumaryl chloride.

21. The method of claim 12, wherein the diisocyanate is an unsaturated aliphatic diisocyanate.

22. The method of claim 17, wherein the diisocyanate is an unsaturated aliphatic diisocyanate.

23. A substrate resistant to ice formation, comprising a substrate having an external surface; and an ice resistant polymer coating on at least a portion of the external surface, wherein the polymer coating is formed from repeat units having the formula:

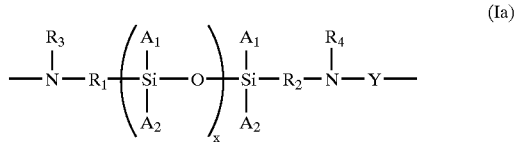

(Ia)

wherein for each repeat unit of the polymer, $R_1$ and $R_2$ are independently selected from the group consisting of $C_1$ to $C_{10}$ alkyls, aryls, and polyaryls;

for each repeat unit of the polymer, $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles;

for each repeat unit of the polymer, $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles;

for each repeat unit of the polymer, x is a number from 1 to 1000; and for each repeat unit of the polymer, Y is selected from a dicarboxyl residue and a non-linear diisocyanate residue, and wherein the polymer comprises at least one repeat unit where Y is a dicarboxyl residue and at least one repeat unit where Y is a nonlinear diisocyanate residue.

24. The substrate of claim 23, wherein at least one of $R_1$ and $R_2$ are selected from the group consisting of halogenated alkyls and halogenated aryls.

25. The substrate of claim 23, wherein x is a number from 200 to 1000.

26. The substrate of claim 23, wherein the substrate is selected from the group consisting of metal, carbon composites, wood, asphalt, resin matrices containing graphite, carbon, or glass fibers, or combinations thereof.

27. The substrate of claim 26, wherein the substrate forms a portion of a vehicle.

28. The substrate of claim 27, wherein the vehicle is an airplane.

29. The substrate of claim 23, wherein the polymer coating comprises a polymer formed from repeat units having the formula:

wherein for each repeat unit of the polymer, Z is a dicarboxyl residue; and for each repeat unit of the polymer, CYAN is a non-linear diisocyanate residue.

30. The coating of claim 23, wherein greater than approximately 80% of the Z components of the polymer are fumaryl moieties.

31. A method of imparting ice inhibiting properties to a substrate, comprising supplying a substrate having an external surface, and applying the polysiloxane(amide-ureide) polymer of claim 1 as a coating to at least a portion of the external surface.

32. The method of claim 31, wherein the polymer coating is applied to the surface as a solution of the polymer in methylene chloride/toluene mixture (1:1 ratio) onto the surface.

33. The method of claim 31, wherein the polymer coating is applied to the surface by dissolving an amine-terminated polyamide intermediate of formula (III) in a methylene chloride/toluene mixture;

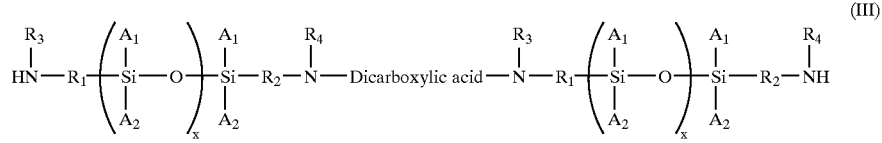

(III)

wherein $R_1$ and $R_2$ are independently selected from the group consisting of $C_1$ to $C_{10}$ alkyls, aryls, and polyaryls;

$R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles;

$A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; and, x is a number from 1 to 1000; and dissolving a stoichiometric amount of diisocyanate (V) in methylene chloride/toluene mixture;

$$O{=}C{=}N{-}X{-}N{=}C{=}O$$

(V)

wherein X is selected from the group consisting of aliphatic and aromatic moieties and the two isocyanate groups are bound to the X moiety so as to be positioned in a non-linear relationship with respect to one another;

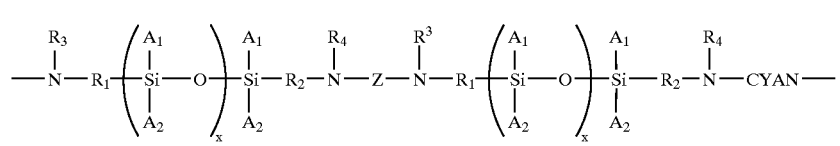

(Ib)

combining the dissolved amine-terminated polyamide intermediate and dissolved diisocyanate just prior to or concurrent with application of the combination to the surface of the vehicle.

34. The method of claim 32, wherein the solution contains solids of the polymer.

35. The method of claim 33, wherein at least one of the solutions contains solids prior to application to the surface of the substrate.

36. The method of claim 31, wherein the substrate is selected from the group consisting of metal, carbon composites, wood, asphalt, resin matrices containing graphite, carbon, or glass fibers, or combinations thereof.

37. The method of claim 36, wherein the substrate forms a portion of a vehicle.

38. The method of claim 37, wherein the vehicle is an airplane.

39. A method of deicing a substrate comprising the steps of:
coating the substrate with a polysiloxane(amide-ureide) coating;
exposing the coated substrate under conditions favorable to the formation of ice upon the surface of the substrate; and,
removing any accumulated ice from the surface of the substrate by application of physical force.

40. The method of claim 39, wherein the substrate is selected from the group consisting of metal, carbon composites, wood, asphalt, resin matrices containing graphite, carbon, or glass fibers, or combinations thereof.

41. The method of claim 40, wherein the vehicle is an airplane.

42. The method of claim 39, where the polysiloxane (amide-ureide) has the formula:

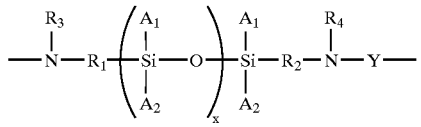

wherein
for each repeat unit of the polymer, $R_1$ and $R_2$ are independently selected from the group consisting of $C_1$ to $C_{10}$ alkyls, aryls, and polyaryls;
for each repeat unit of the polymer, $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles;
for each repeat unit of the polymer, $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles;
for each repeat unit of the polymer, x is a number from 1 to 1000; and
for each repeat unit of the polymer, Y is selected from a dicarboxyl residue and a non-linear diisocyanate residue, and
wherein the polymer comprises at least one repeat unit where Y is a dicarboxyl residue and at least one repeat unit where Y is non-linear diisocyanate residue.

43. The method of claim 42, wherein the dicarboxyl residue is selected from fumaryl moieties, maleyl moieties, saturated $C_2$ to $C_{10}$ dicarboxyl moieties, and partially-saturated $C_4$ to $C_8$ dicarboxyl moieties.

44. The method of claim 43, wherein at least one of $R_1$ and $R_2$ are selected from the group consisting of halogenated alkyls and halogenated aryls.

45. The method of claim 43, wherein x is a number from 200 to 1000.

* * * * *